United States Patent
Zimmermann et al.

[19]

[11] Patent Number: 6,120,278
[45] Date of Patent: *Sep. 19, 2000

[54] DEVICE FOR LAYING A FILM EMERGING FROM A SLOT DIE ONTO A ROTATING TAKE-OFF ROLL

[75] Inventors: Uwe Zimmermann, Hainau; Harald Mueller, Taunusstein; Detlef Wacker, Mainz, all of Germany

[73] Assignee: Mitsubishi Polyester Film GmbH, Wiesbaden, Germany

[ * ] Notice: This patent is subject to a terminal disclaimer.

[21] Appl. No.: 09/179,322

[22] Filed: Oct. 27, 1998

[30] Foreign Application Priority Data

Nov. 7, 1997 [DE] Germany .............................. 197 49 320

[51] Int. Cl.[7] .................................................. B29C 39/42
[52] U.S. Cl. .................................. 425/174.8 E; 425/377; 264/216; 264/467
[58] Field of Search ............................ 425/174.8 E, 377; 264/216, 467

[56] References Cited

U.S. PATENT DOCUMENTS

| | | | |
|---|---|---|---|
| 3,820,929 | 6/1974 | Busby et al. ...................... | 425/174.8 E |
| 5,494,619 | 2/1996 | Zaretsky et al. ........................ | 264/466 |
| 5,975,873 | 11/1999 | Zimmermann et al. ......... | 425/174.8 E |

FOREIGN PATENT DOCUMENTS

WO 95/21735   8/1995   WIPO .

*Primary Examiner*—Harold Pyon
*Assistant Examiner*—Donald Heckenberg

[57] ABSTRACT

A device for laying a molten film 3 emerging from a slot die 2 onto a rotating take-off chill roll 1 has at least one electrode which is arranged parallel to and at a short distance from the surface of the take-off roll 1 and to which a high voltage in the range from 4 to 12 kV is applied. This electrode is, for example, a metal strip 5 which has a tapering sharp edge 6 that is oriented toward the surface of the take-off roll 1. In addition to this metal strip 5, a second electrode 27 is arranged at a distance from the surface of the take-off roll. This second electrode is a metal strip without a strip edge and has applied to it a voltage of a magnitude that is equal to or different from that of the metal strip 5. As a result, electric fields are formed in addition to the electric field from the one metal strip electrode 5.

6 Claims, 1 Drawing Sheet

DEVICE FOR LAYING A FILM EMERGING FROM A SLOT DIE ONTO A ROTATING TAKE-OFF ROLL

BACKGROUND OF THE INVENTION

1) Field of the Invention

The invention relates to a device for laying a molten film emerging from a slot die onto a rotating take-off roll, having at least one electrode which is arranged parallel to and at a short distance from the surface of the take-off roll and to which electric voltage is applied.

2) Prior Art

In the production of films, with thicknesses between 0.5 μm and 350 μm, plastic granules are first melted in an extruder, and the extruded plastic melt is fed to a slot die. The prefilm emerging from this slot die is laid onto a take-off/chill roll and, after leaving the take-off roll, is stretched in and transverse to the machine-running direction in a stretching frame.

In order to stabilize the laying of the prefilm onto the take-off roll, in the prior art, additional forces (beyond the force of extrusion) are applied to the prefilm in the region between the emergence of the prefilm from the slot die and the point at which it is laid on the take-off roll. The additional forces can be produced by: using an air jet from an air knife to blow against the prefilm; spraying water into the gore of the prefilm before the point at which it is laid on the take-off roll; forming a water film on the take-off roll; and generating an electric field by means of a high voltage electrode, the field lines of the electric field being directed toward the surface of the take-off roll. The additional forces are used for the lateral outward displacement of air entrapped between the surface of the take-off roll and the underside of the prefilm, (the side of the prefilm facing the take-off roll), in order to stabilize the laying of the prefilm onto the roll surface over a predefined wrap angle. If this is not successful, air inclusions of so-called "pinning bubbles" are produced, which are located between the underside of the prefilm and the surface of the take-off roll. These pinning bubbles impair the smoothness and thus the quality of the prefilm cooled on the take-off roll, as well as the film biaxially oriented therefrom.

It is known to arrange parallel to the take-off roll surface a metal strip made of stainless steel which acts as an electrode. The metal strip is generally stamped out or cut out from a metal foil of about 20 μm thickness in a width of 10 mm. A metal strip of this type has the disadvantage that it cannot absorb sufficiently high clamping forces, which are necessary to clamp the metal strip with the desired accuracy at a uniform distance from the take-off roll. Furthermore, it is disadvantageous that the edges of the metal strip produced by the cutting or stamping process are irregular, with the result that the electric field between the metal strip and the take-off roll is distorted. These distortions of the electric field are also further amplified because of irregular spacing of the metal strip from the take-off roll surface. The distortions of an electric field lead on the one hand to electric flashovers or arcing, by which the prefilm can be damaged, and on the other hand to the prefilm being laid non-uniformly onto the take-off roll, as a result of which air inclusion between the prefilm and the take-off roll can continue to occur. The distortions of the electric field overall do not lead to the de sired film quality.

The PCT Application WO 95/21735 (German Utility Model G 94 02 027) discloses a device for the production of films, in particular thin or very thin films, having a rotating roll, using a plastically deformable film, preferably supplied through a slot die. The film is extruded or otherwise laid onto the chill roll and an electric voltage is applied to the film between the roll and a metal strip that is arranged parallel to and at a short distance from the roll. The metal strip has a sharp longitudinal edge which is arranged next to and is directed toward the roll at a distance smaller than 6 mm. The sharp longitudinal edge is constructed in the manner of a cutting edge on a sharply tapering region of the metal strip. The center line of the sharply tapering region is aligned with the center of the roll. The use of such a metal-strip electrode improves the film quality, since the air inclusions become smaller in diameter and fewer in number, but not to the extent desired.

U.S. Pat. No. 5,494,619 discloses an electrostatic pinning process in which a wire electrode is arranged between an extrusion die and a take-off roll. A shield at bias voltage is located between the extrusion die and the wire electrode. The bias voltage of the shield is 1 to 10 kV, whereas a voltage of 6 to 15 kV is applied to the wire electrode. In this process, it is essential to apply the highest possible electrostatic charge to the film to be laid onto the take-off roll, in comparison with an arrangement in which the shielding is at ground potential. To this end, there is an optimum bias voltage of the shield, which depends on the voltage of the wire electrode, but differs significantly from the latter and from ground potential. The net current or the electrostatic charge to the film results from the difference between the current from the wire electrode and a previously measured current to the shield. The measurement of current to the shield is obtained by applying voltage to the shield with the wire electrode being at ground potential. For a predefined voltage, which is applied to the wire electrode, a high current is generated from the low electric voltage on the shield having a great number of field lines. The majority of the currents remains on the shield and not on the film. By increasing the voltage on the shield, the current decreases, but more field lines end on the film, and the major part of the current is deflected onto the film. The overlaying of two electrostatic fields does not take place, since the electrically biased shield serves to deflect field lines directed toward it from the wire electrode in the direction of the film.

The object of the present invention is to develop further and to improve a device of the type described in such a way that the air inclusions become significantly smaller and fewer than in the case of devices for films known in the prior art.

SUMMARY OF THE INVENTION

According to the invention, this object is achieved by using two parallel electrodes. One electrode is in the form of a metal strip which has a tapering sharp edge oriented toward the surface of the take-off roll. The second electrode is arranged without a tapering sharp edge, and both electrodes are connected to separate power sources.

In one embodiment of the invention, one electrode consists of a ground metal strip and the second electrode is an unground metal strip.

In a refinement of the invention, the distance of the two electrodes from each other is 6 to 9 mm, in particular 7.5 mm.

In a development of the invention, one electrode consists of a ground metal strip and the second electrode is a round rod with a diameter of 3 to 5 mm. In another embodiment, the second electrode has, for example, a rectangular cross section, with edge lengths of 3 to 6 mm and widths of 80 to 120 μm. Expediently, voltages of equal or different magnitude are applied to the electrodes.

The advantage achieved with the present invention is that, by using separate high-voltage supplies to the electrodes, and by using an electrode which does not have a sharp strip edge, no ionization occurs. The laying-on operation is improved considerably, as is the process reliability, and the positioning of the electrodes is simplified since, in comparison with double strips, the electrode without a sharp strip edge does not flash or arc, and as a result the undesirable interaction normally occurring in the case of double strips is substantially reduced or eliminated.

BRIEF DESCRIPTION OF THE DRAWINGS

The invention will be explained in more detail below using exemplary embodiments illustrated by drawings, in which.

DESCRIPTION OF THE PREFERRED EMBODIMENTS

Figure 1:
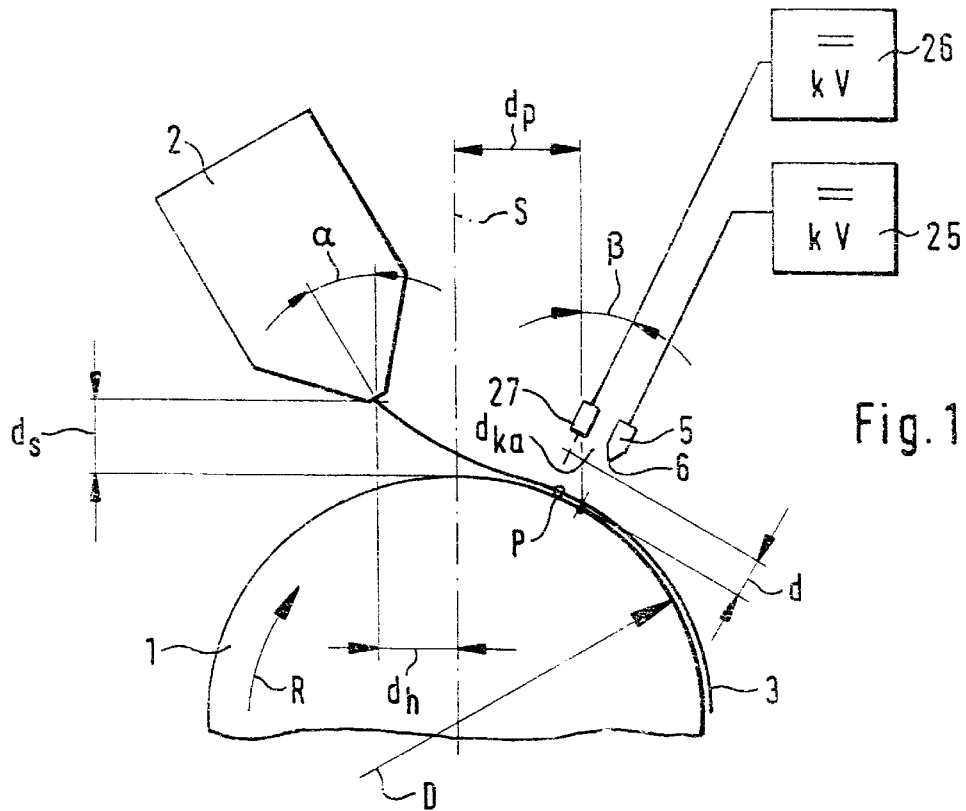
FIG. 1 shows, in a schematic view, a first embodiment of a laying-on device for a film according to the invention, having two metal strips as electrodes.

The schematic view in FIG. 1 shows a take-off roll 1 having a diameter D, which is 600 to 1800 mm. A film 3 is extruded from a slot die 2, and has a parabola-shaped course between the exit slot of the slot die 2 and a contact point P on the surface of the take-off roll 1. This film 3 is a so-called prefilm, which has a thickness between 0.015 and 2.5 mm and a width up to 3 m. This film 3 is transported further on the take-off roll 1, which is chilled to cool and at least partially solidify the prefilm, and subsequently passes into a stretching or orienting frame (not shown), in which the film 3 is stretched in and transverse to the machine running direction. The slot die 2 has a width in the range from 0.2 to 2.9 m, and preferably of more than 2 m (a 2.9 m slot die will produce a film having a width of about 3 m).

The axis of the slot die 2 is inclined at an angle α to a vertical S through the vertex of the take-off roll 1. The angle α lies in the range from 20° to 40°, and preferably α is equal to 30°. The vertical distance $d_s$ of the exit slot of the slot die 2 from the vertex of the take-off roll 1 is 15 to 90 mm, and preferably 70 mm. The same is true of the horizontal distance $d_h$ between the exit slot of the slot die 2 and the vertical S. The distance $d_h$ is 0 to 90 mm, and preferably 70 mm. At a distance d equal to 3 to 6 mm from the surface of the take-off roll 1, as viewed in the direction of rotation R of the take-off roll 1, there is arranged downstream of the contact point P a metal electrode strip 5, which, together with a second metal electrode strip 27, exerts electrostatic pressure on the film 3 to lay substantially free of bubbles onto the surface of the take-off roll 1. The two metal strips 5 and 27 are parallel to each other and are connected to separate power sources 25 and 26, these being high-voltage DC sources which apply to the two metal strips 5 and 27, respectively, in each case a DC voltage of the order of magnitude of 4 to 12 kV. The distance $d_{ka}$ between the center lines of the electrodes is 6 to 9 mm and preferably 7.5 mm. The two metal strips 5 and 27 are inclined by the angle β with respect to the vertical S through the vertex of the take-off roll 1, this angle lying in the range from 20 to 40° and preferably 30°. The horizontal distance $d_p$ between the vertical S and the metal strip 27, that is located closer to the vertical S than electrode 5, is 10 to 80 mm and preferably 30 to 35 mm. The metal strip 5 has a tapering sharp edge 6, which is produced by grinding the metal strip. By contrast, the metal strip 27, is an unground metal strip having a rectangular cross section, whose edge lengths lie in the range from 3 to 6 mm and whose widths lie in a range of 80 to 120 μm.

Figure 2:
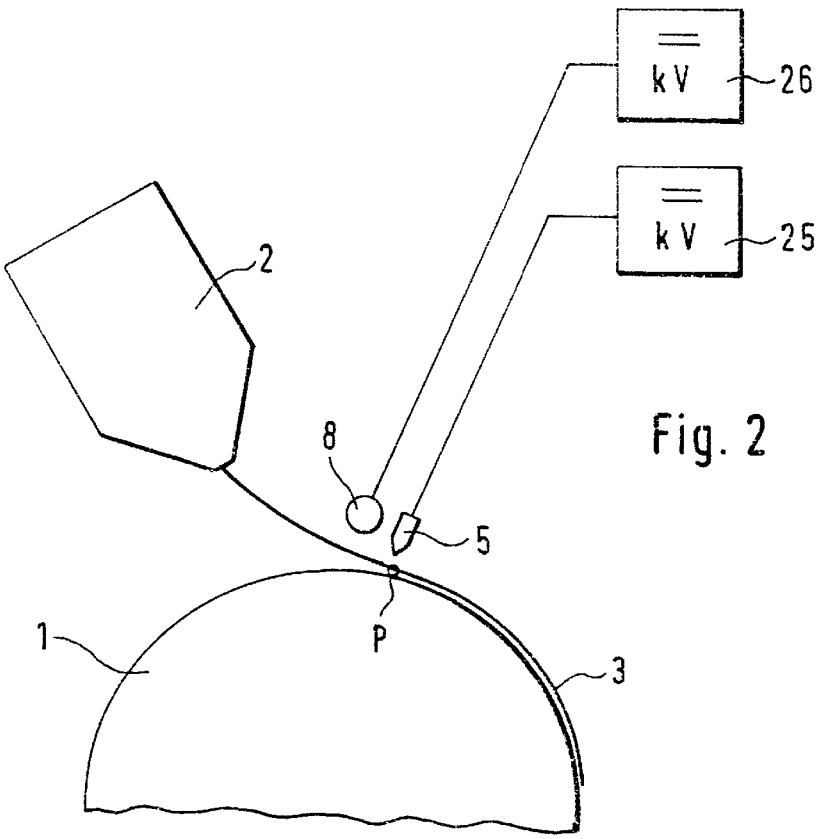
FIG. 2 shows a second embodiment of a laying-on device according to the invention, in which, in addition to a metal strip as electrode, there is a second electrode in the form of a round rod.

FIG. 2 shows in schematic view of a second embodiment of a laying-on device according to the invention, which differs from the first embodiment; illustrated in FIG. 1 in that, in place of the unground metal strip 27 is round rod electrode 8, which is connected to the high-voltage source 26, which applies a voltage in the range from 4.0 kV to 12 kV to the electrode 8. This electrode 8 has a diameter of 3 to 5 mm, and preferably of 3 mm. This electrode 8 is arranged 3 to 8 mm, preferably 5 mm, vertically above the vertex of the take-off roll 1. The distance of the electrode 8 from the take-off roll 1 depends on the magnitude of the high voltage applied to the electrode 8. In this case, the distance is selected such that flashovers (arcing) are avoided to a large extent. The additional electric field of the electrode 8 increases the contact force on the melt film, which results in a distinct improvement in the prefilm quality with regard to pinning bubbles.

The configuration of the electrodes 27 and 8, which do not have sharp edges, prevents any ionization of the air between the electrodes 5 and the film resting on the take-off roll, that is to say no additional charge carriers are produced. On the other hand, the electrode 5, because of its sharp edge 6, initiates ionization with a corresponding number of charge carriers, which press the film against the take-off roll. The electrostatic charge field lines originating from the electrode 27 or 8 reinforce the increase in the electrostatic charges produced by the electrode 5, on the film, which increases the pressure on the film such that the film is laid onto the take-off roll in a better manner, even at higher speeds. Because of the lack of ionization or the lack of the flow of charge carriers from the electrode 27 or 8 to the film on the take-off roll, the pinning operation is significantly more stable than in the case of using two electrodes, each of which generates charge carriers which are overlaid and lead to a less steep increase in the charge carriers on the film.

What is claimed is:

1. A device for laying a molten film comprising: a slot die for extruding a molten film, a rotating take-off chill roll positioned below said slot die and cooling and at least partially solidifying the extruded molten film, at least one electrode arranged parallel to and at a short distance from the surface of the take-off roll, said one electrode (5), configured in the form of a metal strip having a tapering sharp edge (6) that is oriented toward the surface of the take-off roll (1); a second electrode (8; 27) without a tapering sharp edge, positioned parallel to said one electrode; and two separate power sources (25; 26), one of said power sources is connected to said one electrode and the other power source is connected to said second electrode, for applying voltage to the electrode.

2. The device as claimed in claim 1, wherein said one electrode (5) is a ground metal strip and said second electrode (27) is an unground metal strip.

3. The device as claimed in claim 1, wherein the distance between said one electrode and said second electrode is from 6 to 9 mm.

4. The device as claimed in claim 1, wherein said one electrode (5) is a ground metal strip and said second electrode (8) is a round rod with a diameter of from 3 to 5 mm.

5. The device as claimed in claim 2, wherein said second electrode (27) has a rectangular cross section, with edge lengths of from 3 to 6 mm and widths from 80 to 120 μm.

6. The device as claimed in claim 1, wherein voltages of equal or different magnitude are applied to the electrodes (5; 8 or 27).

* * * * *